US009652779B2

(12) United States Patent
Aviv et al.

(10) Patent No.: US 9,652,779 B2
(45) Date of Patent: May 16, 2017

(54) METHOD AND SYSTEM FOR ON-LINE SURVEY RECRUITMENT ENSURING AVAILABILITY OF CONTROL GROUP PARTICIPANTS

(75) Inventors: Ronit Aviv, Holmdel, NJ (US); Peter Hinman Dietrich, Elmhurst, NY (US)

(73) Assignee: Dynamic Logic, Inc., New York, NY (US)

( * ) Notice: Subject to any disclaimer, the term of this patent is extended or adjusted under 35 U.S.C. 154(b) by 1409 days.

(21) Appl. No.: 12/961,126

(22) Filed: Dec. 6, 2010

(65) Prior Publication Data

US 2012/0143675 A1    Jun. 7, 2012

(51) Int. Cl.
*G06Q 30/02* (2012.01)

(52) U.S. Cl.
CPC ..... *G06Q 30/0245* (2013.01); *G06Q 30/0241* (2013.01)

(58) Field of Classification Search
USPC ............................................. 705/14.44, 7.32
See application file for complete search history.

(56) References Cited

U.S. PATENT DOCUMENTS

| 6,236,975 | B1 | 5/2001 | Boe et al. |
| 7,010,497 | B1 * | 3/2006 | Nyhan et al. ............... 705/14.44 |
| 7,769,623 | B2 * | 8/2010 | Mittal et al. ................. 705/7.32 |
| 7,958,000 | B2 * | 6/2011 | Luby et al. .................. 705/7.32 |
| 8,234,152 | B2 * | 7/2012 | Jepson et al. ................ 705/7.32 |
| 2004/0254837 | A1 * | 12/2004 | Roshkoff ........................ 705/14 |
| 2009/0018893 | A1 | 1/2009 | Aviv et al. |
| 2009/0307083 | A1 | 12/2009 | Nyhan et al. |
| 2011/0106605 | A1 * | 5/2011 | Malik et al. ............... 705/14.23 |

FOREIGN PATENT DOCUMENTS

KR    10-2004-0087074 A    10/2004

OTHER PUBLICATIONS

International Searching Authority, International Search Report in corresponding International Application No. PCT/US2011/063455 (Jul. 27, 2012).
Extended European Search Report in co-pending European Application No. 11847468.3 dated May 24, 2016 (8 pages).

* cited by examiner

*Primary Examiner* — Namrata Boveja
*Assistant Examiner* — Allan Woodworth
(74) *Attorney, Agent, or Firm* — Leydig, Voit & Mayer, Ltd.

(57) ABSTRACT

A system and method are described for presenting on-line survey invitations to users over a network. The system enables selectively presenting survey invitations to users in accordance with a survey recruitment definition associated with a tag embedded within an on-line advertisement downloaded and executed on a user computer. If a determination is made by a survey recruitment server that a requestor is to be a potential control (unexposed) survey participant, then instructions are issued to the requesting user computer to obstruct presentation of the on-line advertisement which caused the issuance of the request for a survey invitation from the user computer.

18 Claims, 3 Drawing Sheets

METHOD AND SYSTEM FOR ON-LINE SURVEY RECRUITMENT ENSURING AVAILABILITY OF CONTROL GROUP PARTICIPANTS

TECHNICAL FIELD

The invention relates generally to on-line survey recruitment methods and systems and, more particularly, to integrated systems for selectively presenting on-line surveys to on-line users according to current needs for participants identified as exposed/unexposed to an on-line advertisement campaign (or particular aspect thereof) wherein advertisements are delivered to user computers for display via browser client applications.

BACKGROUND

Businesses have increasingly discovered that the Internet can be an effective forum for recruiting participants for the purpose of executing a survey. Rather than rely upon in-person solicitations on the street and in shopping malls, a variety of survey services leverage Web-enabled survey solicitation mechanisms. Such survey solicitation mechanisms, often in the form of pop-up windows, seek willing survey participants from the millions of user's surfing the Internet on a daily basis. The purpose and subject-matter with which the surveys are associated (e.g., products, services, opinions, political views/elections, sporting events, health, etc.) is virtually limitless.

A particular example of on-line survey fulfillment services involves surveying users that have been exposed to a particular on-line advertisement campaign (exposed group)—as well as those that have not been exposed (control group)—to gauge the effect/impression of the ad campaign on the exposed users. In addition to being a good advertising forum, the Internet has also proven to be a convenient source of consumer survey participants to assess the impact of particular Internet advertising campaigns on exposed users.

Recruiting users to take surveys can be a challenging task. U.S. Pat. No. 6,070,145, entitled "RESPONDENT SELECTION METHOD FOR NETWORK-BASED SURVEY" proposes a method in which visitors to a Web site are randomly chosen to be solicited to take an on-line survey. If a visitor is chosen, then a graphic image soliciting the visitor to take the survey is transmitted from a surveyor to the Web site being visited. The image is then displayed to the visitor. If the visitor is not chosen, then a dummy image is displayed.

Another survey method is described in U.S. Pat. No. 7,010,497, entitled "SYSTEM AND METHOD FOR EVALUATING AND/OR MONITORING EFFECTIVENESS OF ON-LINE ADVERTISING." The method described therein involves determining whether a user has been exposed to an on-line ad campaign by checking cookies stored on the user's computer. Based, at least in part, on this determination, a decision is made as to whether or not to solicit the user to take an on-line survey.

U.S. patent application Ser. No. 09/900,674, filed Jul. 6, 2001, entitled "Method and System for Conducting An On-Line Survey," describes yet another way to carry out on-line surveys. In that system, in response to receiving a request for a block of data from a user's computer, a determination is made whether the user has previously been solicited to take an on-line survey. Thereafter, computer-readable instructions are returned with the requested block of data that facilitate invoking a procedure for soliciting the user to take an on-line survey.

A known survey recruitment method supplements ("tags") advertisements downloaded from ad servers such that the downloaded advertisements include executable instructions for launching a pop-up survey participation invitation via a browser if cookies associated with the browser indicate the browser previously executed an advertisement corresponding to an ad campaign relating to a survey of current interest. Such browsers are deemed to belong to an "exposed" group of potential survey participants. In the same known survey recruitment method, a set of survey participants are recruited from a "control group" (i.e., ones where the browser does not indicate previous execution of an on-line ad from an ad campaign of interest) in reliance on publishers of on-line (e.g., banner) advertisements. In particular, the ad servers are relied upon to insert recruitment messages in a percentage of on-line advertisements downloaded to users/browsers. Proper assessment of an ad campaign's strength relies upon the successful completion of a sufficient number of surveys by participants from the control group and participants from the exposed group.

SUMMARY OF THE INVENTION

A method and system for recruiting on-line survey participants is provided that facilitates recruiting on-line survey participants according to current needs. Instructions inserted into campaign advertisements cause the intended advertisement to be obstructed—including, in particular, replacing the advertisement after a very short time (or preventing its presentation altogether), thus effectively preventing viewing of the online advertisement by a user and thereby preserving the effectively "unexposed" user for inclusion in the control group of survey participants for a particular on-line advertisement campaign.

The method for administering on-line survey recruitment is carried out on a network including a source of survey recruitment definitions and a user computer. In this operating environment the method includes the user computer initially receiving an on-line advertisement block including an on-line advertisement and a survey recruitment tag.

Moreover, the method involves the user computer executing the survey recruitment tag and, as a result, issuing a request for a survey invitation. The request identifies: previous exposure to on-line advertisements, and an advertisement identification corresponding to the on-line advertisement. Finally, the method involves receiving a response to the request for a survey invitation indicating the user computer is to be maintained as a control group participant in a survey corresponding to the online advertisement and, in response, obstructing presentation of the on-line advertisement on the user computer.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
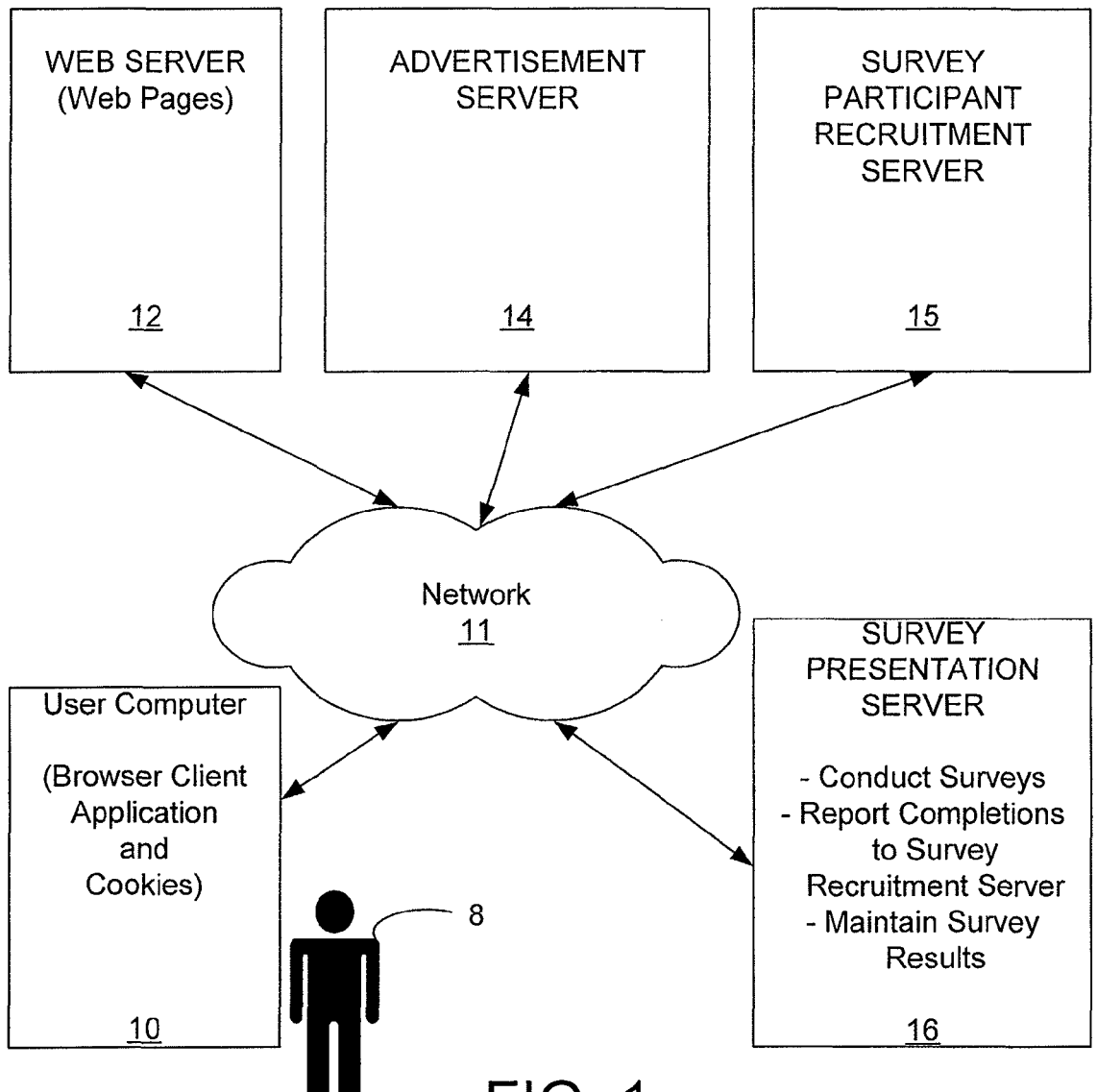
FIG. 1 is a block diagram generally illustrating an example network environment in which an embodiment of the invention is used.

Turning to FIG. 1, an exemplary general network environment is depicted that is suitable for carrying out an on-line ad campaign with associated recruitment and execution of a survey related to the on-line advertisement campaign. More particularly, in accordance with an exemplary embodiment, the network environment supports selectively obstructing, on a user computer 10 (including a browser and associated cookies), an effective display of an on-line advertisement in order to preserve an "unexposed" status for a potential survey participant 8. The unexposed user is thus available to participate as a member of a control group in an on-line survey associated with an advertisement campaign with which the obstructed on-line advertisement is associated.

The exemplary network environment includes a Web server 12 that, upon request from the user computer 10, downloads Web pages to the user computer. In the exemplary network environment the user computer 10 associated with the user 8 executes a browser client application including extensions for executing JavaScript associated with Web pages downloaded from the Web server 12 via a network 11 (e.g., the Internet).

A Web page delivered by the Web server 12 to the user computer 10 via the network 11 includes page content (e.g., a requested news article) and advertisement code. The Web page is processed by the browser client application on the computer 10 after receipt by the user computer 10. Processing the advertisement code (e.g., Java scripts), by the browser client, results in the issuance of a request by the user computer 10 to an Advertisement server 14 for an online advertisement. Such request includes a "placement" description that indicates the location/size of the requested on-line advertisement. The advertisement server thereafter provides an on-line advertisement block (e.g., a combination of HTML and Java scripts) for displaying an on-line advertisement having dimensions corresponding to the placement description in the advertisement request from the user computer 10.

Figure 2:
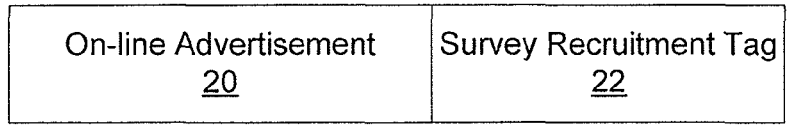
FIG. 2 generally identifies portions of an exemplary on-line advertisement including a survey participant recruitment tag.

Turning briefly to FIG. 2, in an exemplary embodiment, the provided on-line advertisement block includes: an on-line advertisement 20 and a survey participant recruitment tag 22. The on-line advertisement 20 includes a description of an on-line ad (creative) to be displayed via the browser on the user computer 10 at an indicated placement position on the user computer 10's display. The survey participant recruitment tag 22 contains/references instructions that, when executed by the browser, cause the browser to identify certain cookies on the user computer 10 meeting a search criterion (e.g., a specified domain corresponding to a recruitment server 15). By way of example, the instructions executed by the browser cause the browser to issue a request to the survey participant recruitment server 15 with header information and passed parameters (specified in the URL for the server 15), that determine the content of the server 15's response. In an exemplary embodiment, the recruitment tag 22 also includes an identification of a survey for which recruitment of participants is desired.

The aforementioned instructions executed by the browser to issue a request can be specified by the tag 22 in any of a number of (direct/indirect) ways. In an exemplary embodiment, the recruitment tag 22 is a JavaScript instruction containing a reference (e.g., a URL) to a file containing the instructions to be executed by the browser. Alternatively, the tag 22 includes the instructions to be executed by the browser on the user computer 10 (thereby avoiding a further call to a server maintaining the file containing the instructions).

In an exemplary embodiment, the browser on the user computer 10, in response to executing the instructions associated with the tag 22, issues an HTTP request to the recruitment server 15. The HTTP request includes a URL identifying: (1) the server 15, (2) the advertisement (on-line advertisement 20) creative with which the request is associated, and (3) the placement (size and location) of the advertisement on the browser's graphical user interface. Though the illustrative example uses a URL to convey the above-described information from the user computer 10 to the survey participant recruitment server 15, in alternative embodiments the information is provided in alternative message structures.

The HTTP request by the user computer to the server 15 also includes a header identifying each cookie on the user computer 10 corresponding to the domain of the survey participant recruitment server 15. Thus, prior to issuing the request to the server 15, the browser on the user computer 10 searches for responsive cookies on the user computer 10. The responsive cookies include at least ones potentially pertaining/relating to previous presentation by the browser of an advertisement relating to an ad campaign associated with the downloaded on-line advertisement 20. The use of the header of the HTTP request to convey ad exposure information to the server 15 is exemplary. The ad exposure is conveyed in alternative message structures in accordance with other embodiments.

Thus, in an exemplary embodiment, instructions specified (directly/indirectly) by the recruitment tag 22 cause the user computer 10's browser to contact the survey participant recruitment server 15 to initiate a procedure for determining whether to issue a survey invitation to the user computer 10 and to classify the participant as a member of the "exposed" group or "control" group. A more detailed illustrative example of processing the recruitment tag 22 and issuing a corresponding HTTP request to the server 15 is provided in U.S. application Ser. No. 09/900,674, filed Jul. 6, 2001, the contents of which are incorporated herein by reference in their entirety (including any references contained therein).

In an exemplary embodiment, the survey participant recruitment server 15 centrally maintains/administers a set of survey definitions and status information. Among other things, the server 15 maintains a pair of count values (exposed/control) indicating a number of surveys that remain to be taken for a particular advertisement campaign. For each particular campaign, when the server 15 is contacted by a user computer (e.g., user computer 10) in the manner described herein above, the server 15 consults the corresponding exposed/unexposed counters to determine: (1) whether to instruct the user computer to generate an invitation to the user to take an on-line survey, and (2) whether the user is exposed/unexposed. The logic associated with the operation of the survey participant recruitment server 15 is described herein below with reference to FIGS. 3 and 4. Importantly, in the case where the server 15 determines (e.g., from the cookies in the HTTP request header) that the contacting user computer 10's browser is a control (unexposed) group candidate, the server 15 issues a response message including an embedded instruction to the browser to "obstruct" the previously downloaded on-line advertisement (on-line advertisement 20) from the ad server 14 that initiated performance of the above-described survey recruitment procedures.

It is specifically noted that "obstructing" presenting the on-line advertisement includes any preemptive/remedial actions performed by the browser on the user computer 10 that effectively prevent the user 8 from observing/understanding the message conveyed by the downloaded on-line advertisement 20. Such actions include over-laying a new image within the portion of the display of the computer 10 currently displaying the advertisement. In other instances, the advertisement has not been displayed—and is blocked by the browser in accordance with instructions contained in the response message from the survey participant recruitment server 15. By way of example, the obstructing image is an invitation to take a survey. Furthermore, the response message from the server 15 includes instructions for the browser to (re)display the advertisement if the user declines (or does not accept within a specified time period) the invitation to participate in the survey.

It is noted that the above-described survey presentation information/instructions provided by the server 15 to the user computer 10 can be in the form of references to locations of the actual information on yet other networked servers. The particular type and form of a survey invitation to be presented on the user computer is, for example, specified in passed parameter values rather than actual instructions It is also noted that the above-described functionality of the survey participant recruitment server 15 is exemplary and will vary in accordance with alternative embodiments. A more detailed example of the server 15 is provided in the description of a corresponding set of servers in U.S. patent application Ser. No. 09/900,674, filed Jul. 6, 2001, the contents of which are incorporated herein by reference in their entirety (including any references contained therein).

The described functionality of the survey participant recruitment server 15 is implemented, in executable software modules and hardware, in potentially many different ways in accordance with alternative embodiments. The survey participant recruitment server 15, while illustrated as a single entity in FIG. 1, can in fact be implemented as multiple distinct servers at distinct network addresses. There is no intention to limit the manner in which the functionality of the survey participant recruitment server 15 is carried out in server software and hardware. In another illustrative embodiment, the functionality of the survey participant recruitment server 15 is embodied in multiple distinct server applications that reside at a same network address.

By way of example, if the survey logic server 15 determines that a current user is eligible to take a survey, then the logic server 15 returns a URL, with which an invitation to take the survey is associated to the user computer 10, and a survey invitation is subsequently presented on the user computer 10 in accordance with instructions provided, for example, by the server 15. If the user indicates a willingness to take a survey by, for example, clicking on an invitation window displayed on the user computer 10, then a survey server 16 is contacted based upon a click-through URL, and the requested survey session is commenced. Upon successful completion of the survey session, the survey participant recruitment server 15 receives a notification of the completion.

Figure 3:
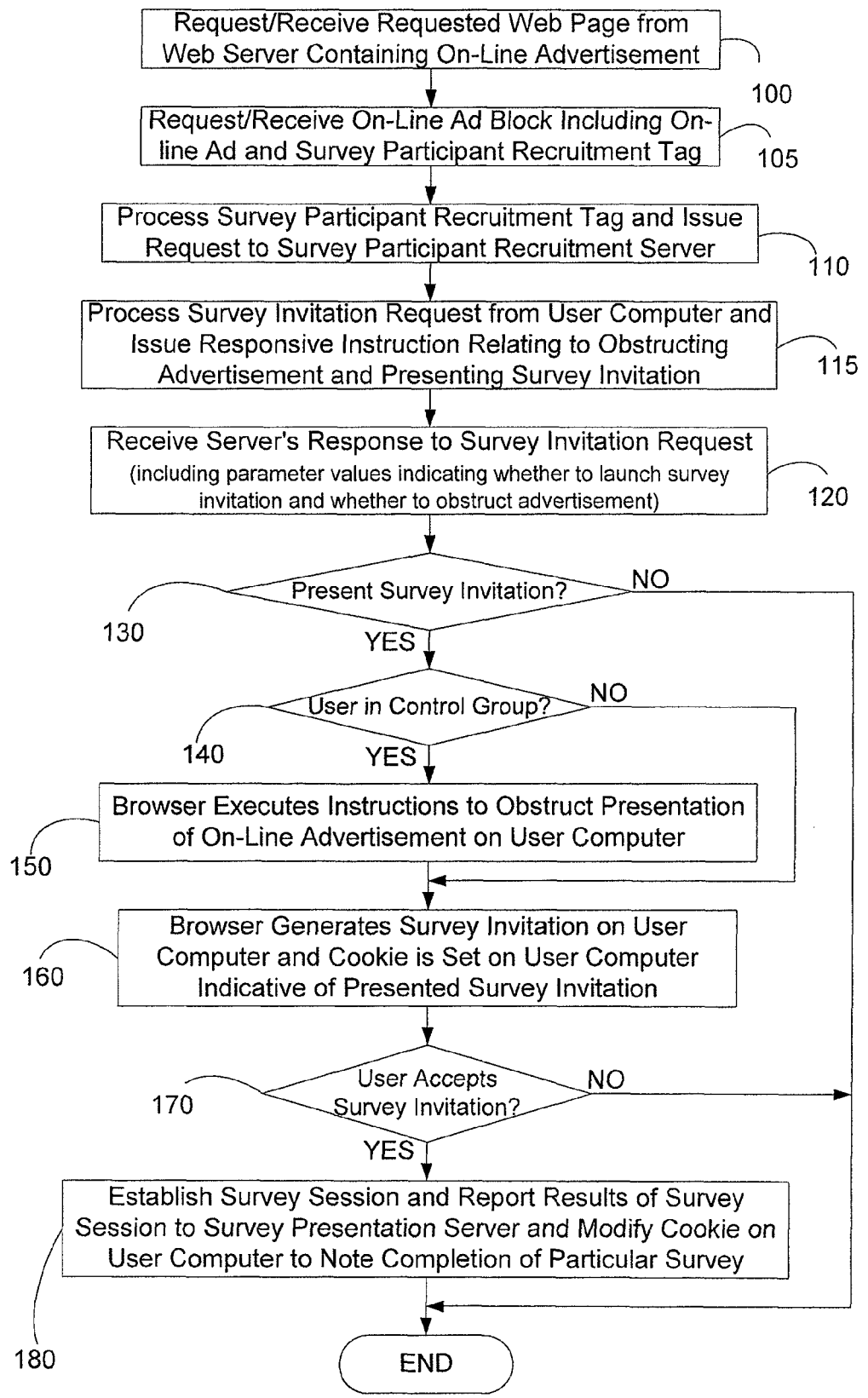
FIG. 3 is a flowchart depicting a set of exemplary steps for downloading and processing a Web page including a survey participant recruitment tag.

Having described an exemplary network environment and dynamic survey recruitment definition update mechanism for carrying out an exemplary embodiment of the present invention, attention is directed to FIG. 3 that summarizes a set of steps associated with, among other things, determining whether to present an invitation to take a survey. More importantly, however, in accordance with an exemplary embodiment, steps are performed to ensure a user can be used as a participant in a control group that has not been exposed to a particular ad campaign. This is achieved by obstructing an advertisement that was previously downloaded by the ad server 14 with additional instructions relating to the invitation to take a survey relating to the downloaded advertisement. While "obstructing" ideally involves preventing the on-line advertisement from being displayed on the user computer 10, obstructing the displayed image of the on-line advertisement 20 specifically includes covering/obscuring/replacing a previously displayed image of the on-line advertisement on a user interface of the user computer 10 such that the user 8 is effectively prevented from being exposed to the on-line advertisement 20's message.

Initially, during step 100, the browser running on the user computer 10 requests and receives a requested Web page from the Web server 12. The received Web page includes an on-line advertisement. By way of example, the on-line advertisement is provided in the form of an on-line advertisement tag that, when processed by the browser, causes downloading an on-line advertisement block (see, FIG. 2) to the user computer 10 from the advertisement server 14.

In the exemplary embodiment, during step 105, the browser processes the Web page containing the advertisement tag and requests/receives the on-line advertisement block from the ad server 14. The downloaded on-line ad block (see, e.g., FIG. 2) includes the on-line advertisement 20 and the survey participant recruitment tag 22. In an alternative embodiment, instead of the advertisement tag, the Web page from the Web server 12 contains actual instructions for presenting the on-line advertisement on the browser's user interface. Those skilled in the art will appreciate the many alternatives for specifying an on-line advertisement within a Web page downloaded to the browser.

After receiving the on-line advertisement block, the browser on the user computer 10 commences processing the on-line ad block requested/received during step 105. The processing of the on-line advertisement 20 of the advertisement block by the browser on the user computer 10 results in presentation of an on-line advertisement ("creative") within an area corresponding to a specified placement. Processing the on-line advertisement 20 portion of the on-line ad block is well known to those skilled in the art and will not be discussed in detail herein.

In accordance with the illustrative embodiment, during step 110 the browser 10 processes the survey participant recruitment tag 22 contained in the on-line ad block requested/received during step 105. Such processing includes: (1) accessing cookies on the user computer 10 relating to exposure to one or more relevant advertisement campaigns, and (2) building an HTTP request for submission to the survey participant recruitment server 15. The HTTP request potentially relates to one or more surveys for advertisement campaigns. In an exemplary embodiment, the request includes: (1) an advertisement ID (corresponding to the on-line advertisement received/processed during step 100), (2) a placement identification (location and size of advertisement on page), (3) a survey ID, and (4) cookie information potentially identifying exposure to an ad campaign (including potentially many distinct advertisements). As a result of processing the tag 22, during step 110, the browser on the user computer 10 issues the HTTP request to the survey participant recruitment server 15 in the form of a URL including a set of appended parameters (e.g., the ad ID, placement ID and survey ID) and a header including a set of cookies corresponding to the domain of the server 15. The set of cookies identify, among other things, exposure (via the browser on the user computer 10) to particular on-line advertisements and/or more generally exposure to on-line ad campaigns.

During step 115 a survey invitation request from the user computer 10 is received and processed by the survey participant recruitment server 15. During processing of the request, the server 15 executes decision logic to determine whether to present a survey invitation to the user 8 via the browser's user interface. The decision process uses the parameter values (provided in the URL) and cookies (provided in the request header) in the HTTP request issued by the user computer 10 during step 110. An exemplary decision-making procedure carried out by the server 15 during step 115 is described herein below with reference to FIG. 4. In accordance with an exemplary embodiment, the server 15 determines: (1) whether to issue a survey invitation to the user 8 of the computer 10 and (2) whether to issue instructions to the browser on the user computer 10 to obstruct presentation of the on-line advertisement downloaded during step 105. During step 115 the server 15 creates/issues a response in accordance with the two aforementioned determinations.

During step 120 the user computer 10 receives a response issued by the survey participant recruitment server 15 during step 115. The response corresponds to the user computer 10's survey invitation request issued during step 110. The response contains a set of parameter values including ones for indicating: (1) a survey for which an invitation is to be presented on the user computer 10, and (2) whether the advertisement downloaded to the user computer 10 during step 105 is to be obstructed (in order to preserve the unexposed status of the user 8 on the user computer 10).

During step 130, if the response received by the user computer 10 does not specify a survey invitation to be obtained and displayed by the computer 10, then control passes to the End. It is noted that, in an exemplary embodiment, if no survey invitation is to be presented, then the on-line advertisement downloaded during step 105 is processed and displayed on the user computer 10 without regard to the determinations made during steps 110, 115 and 120.

If, during step 130, a survey invitation is to be displayed, then control passes from step 130 to step 140. During step 140, a determination is made with regard to whether the user is to be included in a control group (i.e., survey participants that are considered unexposed to a particular ad or ad campaign). If the response received by the user computer 10 indicates that the user is to be included as part of a control group, then control passes from step 140 to step 150.

During step 150 instructions, provided in association with the response from the recruitment server 15 indicating the potential participant is to be treated as a member of the survey's control group, are executed by the browser on the user computer 10 to obstruct the downloaded on-line advertisement (from step 105). In the exemplary embodiment, obstructing the advertisement involves covering the display space previously allocated on the browser's graphical user interface for displaying the on-line advertisement 20. Control then passes to step 160.

In the exemplary embodiment, the on-line advertisement 20 is presented by the browser without waiting for the server 15's response. Thus, the on-line advertisement 20 is potentially displayed for a short period of time while awaiting the completion of step 150. However, in an alternative embodiment, presentation of the downloaded advertisement is blocked/delayed pending notification from the server 15 regarding whether the user 8 is to be a member of a control group. In such embodiments the portion of the user interface set aside for displaying the on-line advertisement remains blank until the response is received from the server 15 indicating whether the user 8 is to be treated as a control group participant. During step 150, obstructing the on-line advertisement 20 is carried out by skipping execution of instructions that would otherwise result in displaying the on-line advertisement. Upon completion of the instructions for obstructing presentation of the on-line advertisement 20, control passes from step 150 to step 160.

During step 160, the browser of the user computer 10 presents the survey invitation in the form of a floating pop-up window specified in a survey creative of a survey definition specified in the server 15's response received by the user computer during step 120. However, a variety of ways for accessing and presenting survey invitations on the user computer 10 (during step 160) are contemplated in various exemplary embodiments. For example, in an alternative embodiment, the browser generates/presents a survey invitation within the placement (location/size) of the image for the on-line advertisement 20.

Furthermore, since each survey is capable of specifying its own particular survey creative, the information conveyed in the survey invitation generated/displayed during step 160 can vary. For example, in most cases a "blind" invitation is presented that does not convey any information regarding the nature of the survey that will be provided in response to a user's acceptance of a presented invitation. In other cases, a hint is provided about the nature of a contemplated survey.

Also, during step 160 a cookie is modified on the user computer 10 to indicate the presentation of the survey invitation. In a particular embodiment, the cookie includes a time/date stamp identifying when the invitation was presented on the user computer 10. Other information indicating the particular survey invitation presented and/or ad campaign is also potentially included in the cookie data stored during step 160.

In an alternative embodiment, obstructing the downloaded on-line advertisement during step 150 involves overwriting, with a survey invitation (see, step 160 described herein above), the portion of the user interface used to present the on-line advertisement on the user computer 10. In this particular embodiment, steps 150 (obstruct on-line advertisement) and 160 (presenting survey invitation) are performed together as a single action for a control group member. This alternative embodiment/placement of the survey invitation does not preclude the browser from being instructed to present an additional survey invitation as a floating pop-up window as described previously herein above with reference to step 160.

If, at step 140, the user is not identified as being a potential control group participant in the survey, then control passes from step 140 to step 160.

After generating/presenting the survey invitation, control passes from step 160 to step 170 wherein, if the user declines the invitation to take a survey, then control passes to the End. In an exemplary embodiment, in response to the user declining to take the survey, the image for the on-line advertisement 20 is (re)displayed. Otherwise, if the user accepts the invitation, then control passes from step 170 to step 180.

During step 180, the browser on the user computer 10 establishes a session with the survey presentation server 16 to conduct an on-line survey corresponding to the determination of a survey during step 115. During the course of the survey session, user responses are acquired and stored by the contacted survey presentation server 16. Upon successful completion of the survey session, the survey presentation server 16 provides an update, if needed, to the survey participant recruitment server 15. Such update potentially indicates a new number of participants (of potentially a particular type) that are needed for a particular survey campaign in view of the successful completion of the current survey session with the user 8. Such information generally results in the server 15 re-calculating its survey participant needs. Furthermore, upon completion of the survey, a cookie is modified on the user computer 10 to note the particular survey's completion.

It is noted that, in an exemplary embodiment, the identity of the survey-enabled on-line advertisement (and/or Web page) from which a completed survey originated is maintained throughout the course of executing the downloaded logic of the survey recruitment definition. Thus, successful completion of a particular survey and its associated source are reported to the recruitment server 15 during step 180. Control then passes to the End.

Figure 4:
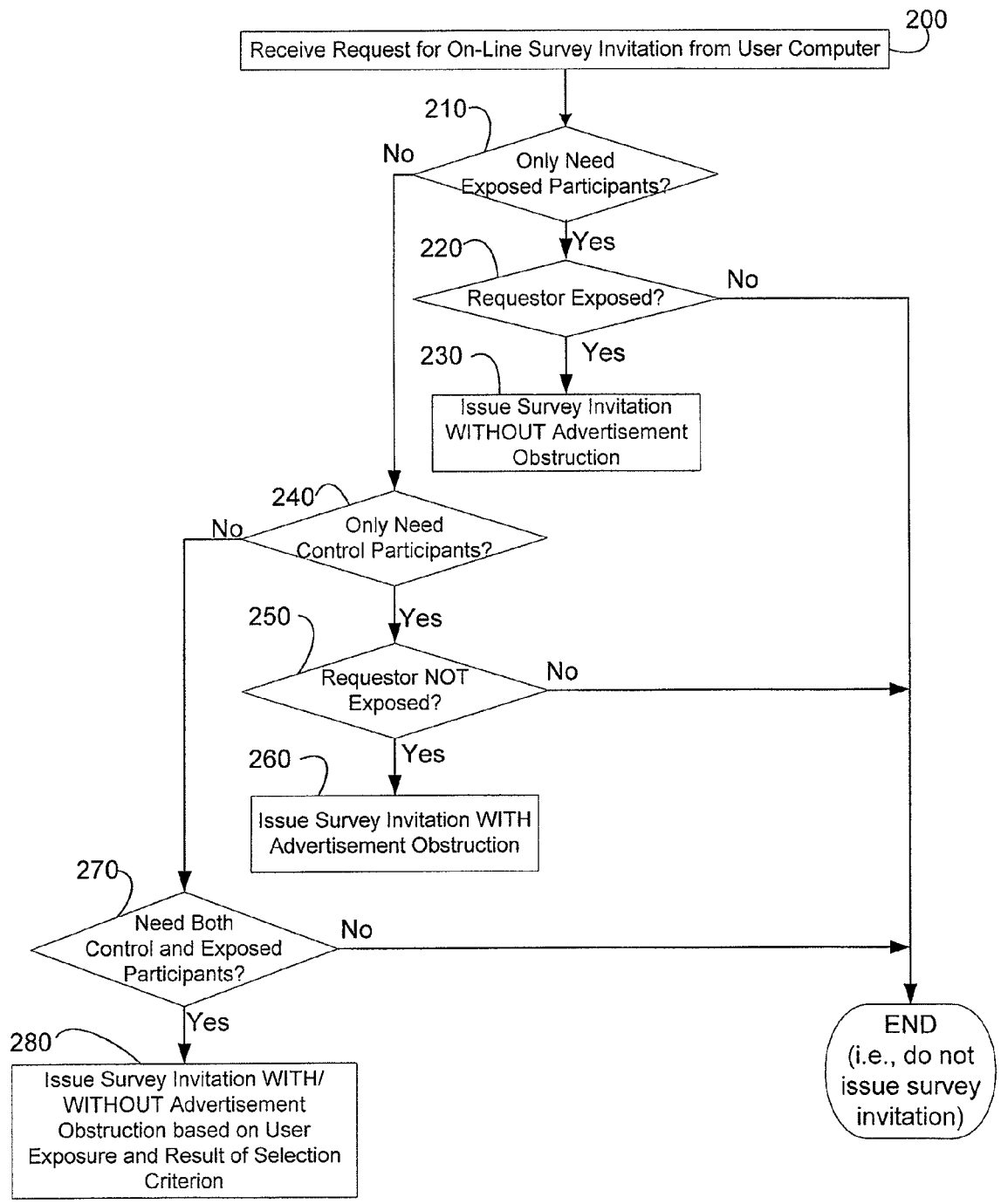
FIG. 4 is a flowchart depicting a set of exemplary steps associated with logic executed on the survey recruitment server to determine whether to issue on-line advertisement obstructing instructions to a browser to preserve "unexposed" status for the browser.

Turning to FIG. 4, a set of steps are summarized for determining, by the survey participant recruitment server 15, a type of participant (control/exposed) for a particular invitation to take an on-line survey. In general, during processing of the survey request (issued by the user computer 10 during step 110), the survey participant recruitment server 15 initially determines the type of potential participant (exposed group or control group). If the user is designated as a potential control group survey participant, then the server 15 sends a response specifying an instruction to obstruct presentation of the on-line advertisement previously received by the user computer 10 during step 105.

During step 200, the survey participant recruitment server 15 receives a request for an on-line survey invitation from the user computer 10. Thereafter, at step 210, if only exposed participants are needed, then control passes to step 220. During step 220, if the server 15 determines that the requesting user computer 10 has been sufficiently exposed to classify the requestor as part of the exposed group (i.e., a cookie indicates the browser on the user computer previously presented a relevant on-line advertisement), then control passes to step 230 where the server 15 issues an instruction to present a survey invitation to the user computer 10 (see, FIG. 3, steps 115 and 120) without the aforementioned instruction to obstruct the on-line advertisement.

During step 220, if the requestor is deemed not exposed, then control passes from step 220 to the End step wherein the survey participant recruitment server 15 issues a response indicating that no survey invitation is to be displayed on the user computer 10. Moreover, in an exemplary embodiment, the server 15 does not issue an instruction/command parameter in the response to the user computer 10 to obstruct the on-line advertisement 20. The user, in this embodiment, will become a member of the exposed group (for future consideration when determining whether to issue a survey invitation at a later time).

Control passes to step 240 if the test at step 210 fails. In other words the following status is observed: (1) both types of participants are needed, (2) only unexposed survey participants are needed, or (3) no participants are needed. At step 240, if only unexposed (control group) participants are needed, then control passes to step 250. During step 250, if the server 15 determines that the requesting user computer 10 has not been sufficiently exposed (i.e., a cookie indicates the browser on the user computer has not previously presented a relevant on-line advertisement), then control passes to step 260 where the server 15 issues an instruction to present a survey invitation to the user computer 10 (see, FIG. 3, steps 115 and 120) including a passed parameter value (or instruction) causing the browser on the user computer 10 to obstruct (e.g., over-write or preclude presentation of) the on-line advertisement received by the computer 10 during step 105. If the server determines at step 250 that the browser on the user computer 10 was exposed to a related on-line advertisement, then control passes to the End. In that case, no instruction is issued to the user computer 10 to obstruct the on-line advertisement 20.

Control passes to step 270 if the test at step 240 fails. In other words the following status is observed: (1) both types of participants are needed or (2) no participants are needed. During step 270, if both exposed and unexposed participants are needed for an on-line survey, then control passes to step 280 wherein an on-line survey invitation instruction is generated for return to the user computer 10. In an exemplary embodiment where the invitation does not replace the on-line advertisement, the type of invitation is based initially on whether the user computer 10 was exposed (limiting the user to the exposed group). If the user computer 10 does not indicate past exposure to a relevant on-line advertisement, then a selection criterion is executed (e.g., random selection) to determine whether the survey invitation will specify obstruction of the on-line advertisement in order to ensure the unexposed status of browser on the user computer 10 while the survey invitation is presented to the user of the computer 10.

If neither control nor exposed group participants are needed for the particular survey, then control passes from step 270 to the End.

It can thus be seen that a new and useful method and system for recruiting and conducting an on-line survey have been provided. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrative embodiment shown in software, comprising computer-executable instructions stored on computer-readable media, may be implemented in hardware and vice versa or that the illustrative embodiment can be modified in arrangement and detail without departing from the spirit of the invention. Therefore, the invention as described herein contemplates all such embodiments as may come within the scope of the following claims and equivalents thereof.

What is claimed is:

1. A method for administering on-line survey recruitment on a network including a source of survey recruitment definitions and a user computer, the method comprising:

receiving, by the user computer, an on-line advertisement block including both:

instructions for displaying an on-line advertisement on a display of the user computer, such displaying of the on-line advertisement, if not obstructed, resulting in identification of the user computer as belonging to an exposed group with regard to an on-line survey relating to the on-line advertisement, and a survey recruitment tag;

executing, by the user computer, the survey recruitment tag and, as a result, issuing a request for a survey invitation, wherein the request for the survey invitation includes:

information for determining previous exposure to on-line advertisements, and an advertisement identification corresponding to the on-line advertisement; and receiving, by the user computer, a response to the request for a survey invitation, the response including an indication that the user computer is to be maintained as a control group participant in the on-line survey relating to the online advertisement received in the on-line advertisement block; and obstructing presentation of the on-line advertisement on the display of the user computer in response to the receiving the response including the indication.

2. The method of claim 1 wherein the obstructing presentation of the on-line advertisement comprises over-writing a portion of the display of the user computer presenting the on-line advertisement.

3. The method of claim 1 wherein presentation of the downloaded advertisement is delayed pending receipt of the response to the request for a survey invitation; and wherein the obstructing presentation of the on-line advertisement is carried out by presenting a blank space in a portion of the display of the user computer for displaying the on-line advertisement until the response to the request for a survey invitation is received and processed to determine whether a user of the user computer is to be treated as a control group participant.

4. The method of claim 1 wherein the survey invitation is presented as a pop-up window on the display of the user computer presenting the on-line advertisement.

5. The method of claim 1 wherein the survey invitation is presented on a portion of the display of the user computer presenting the on-line advertisement, thus obstructing presentation of the on-line advertisement.

6. The method of claim 1 wherein the response to the request for a survey invitation is provided by a survey participant recruitment server communicatively connected to the user computer via the network.

7. A non-transient computer-readable medium including computer-executable instructions for administering on-line survey recruitment on a network including a source of survey recruitment definitions and a user computer, the computer-executable instructions facilitating performing a method comprising the steps of:

receiving, by the user computer, an on-line advertisement block including both:

instructions for displaying an on-line advertisement on a display of the user computer, such displaying of the on-line advertisement, if not obstructed, resulting in identification of the user computer as belonging to an exposed group with regard to an on-line survey relating to the on-line advertisement, and a survey recruitment tag;

executing, by the user computer, the survey recruitment tag and, as a result, issuing a request for a survey invitation, wherein the request for the survey invitation includes:

information for determining previous exposure to on-line advertisements, and an advertisement identification corresponding to the on-line advertisement; and receiving, by the user computer, a response to the request for a survey invitation, the response including an indication that the user computer is to be maintained as a control group participant in the on-line survey relating to the online advertisement received in the on-line advertisement block; and obstructing presentation of the on-line advertisement on the display of the user computer in response to the receiving the response including the indication.

8. The non-transient computer-readable medium of claim 7 wherein the obstructing presentation of the on-line advertisement comprises over-writing a portion of the display of the user computer presenting the on-line advertisement.

9. The non-transient computer-readable medium of claim 7 wherein presentation of the downloaded advertisement is delayed pending receipt of the response to the request for a survey invitation; and wherein the obstructing presentation of the on-line advertisement is carried out by presenting a blank space in a portion of the display of the user computer for displaying the on-line advertisement until the response to the request for a survey invitation is received and processed to determine whether a user of the user computer is to be treated as a control group participant.

10. The non-transient computer-readable medium of claim 7 wherein the survey invitation is presented as a pop-up window on the display of the user computer presenting the on-line advertisement.

11. The non-transient computer-readable medium of claim 7 wherein the survey invitation is presented on a portion of the display of the user computer presenting the on-line advertisement, thus obstructing presentation of the on-line advertisement.

12. The non-transient computer-readable medium of claim 7 wherein the response to the request for a survey invitation is provided by a survey participant recruitment server communicatively connected to the user computer via the network.

13. A system for facilitating administering survey recruitment on a network including a source of survey recruitment definitions, the system including:

a user computer comprising a non-transient memory and a processor for storing and executing computer-executable instructions for facilitating performing the steps of:

receiving, by the user computer, an on-line advertisement block including both:

instructions for displaying an on-line advertisement on a display of the user computer, such displaying of the on-line advertisement, if not obstructed, resulting in identification of the user computer as belonging to an exposed group with regard to an on-line survey relating to the on-line advertisement, and a survey recruitment tag;

executing, by the user computer, the survey recruitment tag and, as a result, issuing a request for a survey invitation, wherein the request for the survey invitation includes:

information for determining previous exposure to on-line advertisements, and
an advertisement identification corresponding to the on-line advertisement; and receiving, by the user computer, a response to the request for a survey invitation, the response including an indication that the user computer is to be maintained as a control group participant in the on-line survey relating to the online advertisement received in the on-line advertisement block; and obstructing presentation of the on-line advertisement on the display of the user computer in response to the receiving the response including the indication.

14. The system of claim 13 wherein the obstructing presentation of the on-line advertisement comprises overwriting a portion of the display of the user computer presenting the on-line advertisement.

15. The system of claim 13 wherein presentation of the downloaded advertisement is delayed pending receipt of the response to the request for a survey invitation; and wherein the obstructing presentation of the on-line advertisement is carried out by presenting a blank space in a portion of the display of the user computer for displaying the on-line advertisement until the response to the request for a survey invitation is received and processed to determine whether a user of the user computer is to be treated as a control group participant.

16. The system of claim 13 wherein the survey invitation is presented as a pop-up window on the display of the user computer presenting the on-line advertisement.

17. The system of claim 13 wherein the survey invitation is presented on a portion of the display of the user computer presenting the on-line advertisement, thus obstructing presentation of the on-line advertisement.

18. The system of claim 13 wherein the user computer and the survey participant recruitment server computer are communicatively connected via the network.

\* \* \* \* \*